United States Patent
Nishikawa et al.

(10) Patent No.: US 7,199,953 B2
(45) Date of Patent: *Apr. 3, 2007

(54) MAGNETIC TRANSFER MASTER MEDIUM, MAGNETIC TRANSFER METHOD, AND MAGNETIC TRANSFER MASTER MEDIUM FORMING METHOD

(75) Inventors: Masakazu Nishikawa, Kanagawa-ken (JP); Kazunori Komatsu, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 10/843,585

(22) Filed: May 12, 2004

(65) Prior Publication Data
US 2004/0209037 A1    Oct. 21, 2004

Related U.S. Application Data

(62) Division of application No. 10/146,888, filed on May 17, 2002, now Pat. No. 6,790,534.

(30) Foreign Application Priority Data

| May 18, 2001 | (JP) | 2001-149351 |
| Jun. 20, 2001 | (JP) | 2001-186799 |
| Jun. 25, 2001 | (JP) | 2001-191323 |
| Sep. 28, 2001 | (JP) | 2001-302234 |

(51) Int. Cl.
G11B 5/716  (2006.01)
G11B 27/02  (2006.01)

(52) U.S. Cl. .................. 360/17; 428/836; 428/848.1

(58) Field of Classification Search ............... 360/16, 360/17, 55, 77.01; 428/833, 843.7, 848.1, 428/848.51, 692.1, 836.1, 848.5, 694 SG, 428/836.2, 836.3; 427/127, 130
See application file for complete search history.

(56) References Cited

U.S. PATENT DOCUMENTS

| 5,981,039 | A |    | 11/1999 | Isono et al. |
| 6,347,016 | B1 | *  | 2/2002  | Ishida et al. .................. 360/17 |
| 6,735,026 | B2 | *  | 5/2004  | Nishikawa et al. ........... 360/17 |
| 6,759,183 | B2 | *  | 7/2004  | Nagao et al. ................. 360/17 |

(Continued)

FOREIGN PATENT DOCUMENTS

EP    0 915 456 A1    5/1999

(Continued)

*Primary Examiner*—Carol Chaney
*Assistant Examiner*—Louis de Falasco
(74) *Attorney, Agent, or Firm*—Sughrue Mion, PLLC

(57) ABSTRACT

A favorable magnetic transfer is performed to a perpendicular magnetic recording medium. A master medium is provided with a substrate on the surface of which protrusion portions, which form a pattern corresponding to the data that is to be transferred, having a pliable layer thereon have been formed. The master medium is further provided with a soft magnetic layer formed in the depression portions between the protrusion portions, and which is magnetically linked to the soft magnetic layer of the protrusion portions. The soft magnetic layer of the surface of the protrusion portions is conjoined with the magnetic recording layer of a perpendicular magnetic recording medium to form a conjoined body, and a transfer magnetic field is applied to the conjoined body in the direction from the substrate of the master medium toward the slave medium to perform the magnetic transfer.

14 Claims, 6 Drawing Sheets

U.S. PATENT DOCUMENTS

| | | | |
|---|---|---|---|
| 6,785,069 B2 * | 8/2004 | Nishikawa et al. | 360/17 |
| 6,865,038 B2 * | 3/2005 | Nishikawa et al. | 360/17 |
| 2001/0055699 A1 * | 12/2001 | Kato et al. | 428/694 BR |
| 2002/0197513 A1 * | 12/2002 | Murao et al. | 428/694 BS |
| 2004/0218475 A1 * | 11/2004 | Nishikawa et al. | 369/13.02 |

FOREIGN PATENT DOCUMENTS

| | | |
|---|---|---|
| JP | 57-158041 A | 9/1982 |
| JP | 63-183623 | 7/1988 |
| JP | 10-40544 | 2/1998 |
| JP | 10-269566 | 10/1998 |
| WO | WO 98/03972 | 1/1998 |

\* cited by examiner

MAGNETIC TRANSFER MASTER MEDIUM, MAGNETIC TRANSFER METHOD, AND MAGNETIC TRANSFER MASTER MEDIUM FORMING METHOD

This is a divisional of application Ser. No. 10/146,888 filed May 17, 2002 now U.S. Pat. No. 6,790,534; the disclosure of which is incorporated herein by reference.

BACKGROUND OF THE INVENTION

1. Field of the Invention

The present invention relates in general to a magnetic transfer master medium provided on the surface thereof with protrusion portions formed in a pattern for transmitting data to a magnetic recording medium, and in particular to a magnetic transfer master medium for transferring data to a perpendicular magnetic recording medium.

Further, the present invention relates to a magnetic transfer method of employing the magnetic transfer master medium according to the present invention to transfer data to a perpendicular magnetic recording medium, and a magnetic transfer master medium forming method.

2. Description of the Related Art

Generally speaking, with regard to magnetic storage mediums, there is a demand for increased storage capacity and low cost. Further desired are so-called high-speed access mediums, which are capable of advantageously reading out the data of a desired location in a short time. Examples of these mediums include the high speed magnetic recording mediums (magnetic disk mediums) utilized in hard disk apparatuses and flexible disk apparatuses. So-called tracking servo technology, wherein the magnetic head accurately scans a narrow width track to achieve a high S/N ratio, plays a substantial role in attaining the high storage capacity thereof. A servo signal, address data signal, replay clock signal, etc., used for tracking within a certain interval occurring in one rotation of the disk are "preformatted", that is, recorded on the disk in advance.

Magnetic transfer methods realizing accurate and efficient preformatting, wherein the data such as a servo signal or the like borne on a master medium is magnetically transferred therefrom to a magnetic recording medium, have been proposed in, for example, Japanese Unexamined Patent Publication Nos. 63(1988)-183623, 10(1998)-40544, and 10(1998)-269566.

According to these magnetic transfer technologies, a master medium having an uneven pattern corresponding to the data that is to be transferred to a slave medium (a magnetic recording medium) is prepared. By bringing this master medium brought into close contact with a slave medium to form a conjoined body, and applying a transfer magnetic field thereto, a magnetic pattern corresponding to the data (e.g., a servo signal) borne on the master medium is transferred to the slave medium. The preformatting can be performed without changing the relative positions of the master medium and the slave medium; that is, while the two media remain stationary. Therefore not only is it possible to perform an accurate recording of the preformat data, it becomes possible to advantageously do so in an extremely short time.

However, as to the magnetic recording medium, two possibilities are longitudinal magnetic recording mediums provided with an easy magnetization axis in the horizontal direction in relation to the surface of the magnetic layer thereof, and perpendicular magnetic recording mediums provided with an easy magnetization axis in the vertical direction in relation to the surface of the magnetic layer thereof; however, in current practice, longitudinal magnetic recording mediums are generally employed, and the magnetic transfer technology described above has also been developed focusing mainly on the longitudinal magnetic recording mediums as the magnetic recording medium of choice. On the other hand, if a perpendicular magnetic recording medium is employed, an increase in data storage capacity can be expected in comparison to the longitudinal magnetic recording mediums.

For cases in which a magnetic transfer is performed on a perpendicular magnetic recording medium, a magnetic field must be applied in the perpendicular direction with respect to the surface of the magnetic layer thereof; wherein the optimal conditions differ in contrast to cases in which a magnetic transfer is performed on a longitudinal magnetic recording medium.

For example, when a magnetic transfer is performed to a perpendicular magnetic recording medium, the magnetic disorder is large at the border portions between the inverse magnetization portions and the uninverted magnetization portions, wherein a problem arises in that the signal quality is not favorable. Based upon the analysis by the inventors of the present invention, it has become clear that this problem is due to an insufficient constraint of the magnetic flux of the inverse magnetization portions, and is the cause of a reduction in signal quality.

Further, when a perpendicular magnetic transfer is to be performed, the thickness of the pattern of protrusion portions formed by the magnetic layer of the master medium is made thin. Because the magnetic pole distance generated to pass a magnetic field through vertically is short (diamagnetic field), and there is no assistance from adjacent protrusion portions in constraining the magnetic flux between protrusion portions, etc.; it is difficult to realize sufficiently favorable signal quality by providing a soft magnetic layer having a simple form.

SUMMARY OF THE INVENTION

The present invention has been developed in view of the forgoing circumstances, and it is an object of the present invention to provide a magnetic transfer master medium capable of performing a favorable magnetic transfer onto a perpendicular magnetic recording medium.

The magnetic transfer master medium according to the present invention is a magnetic transfer master medium comprising a substrate provided with a surface on which protrusion portions having a magnetic layer have been formed for transferring data to the magnetic layer of a perpendicular magnetic recording medium, wherein the magnetic layer is also formed in the depression portions between the protrusion portions so that the magnetic layer formed on the protrusion portions and the magnetic layer formed in the depression portions are magnetically linked, and the ratio of the thickness of said magnetic layer to the track direction width of the magnetic layer of the protrusion portions is greater than or equal to 0.8, and less than or equal to 3.

Here, the expression "a surface on which protrusion portions having a magnetic layer" refers to the portions protruding from base of the depression portions before the magnetic layer has been formed therebetween; wherein, a magnetic layer is formed over at least the tip portion of the these protrusion portions, and the protrusion portions themselves may be formed from the magnetic layer.

Further, the expression "are magnetically linked" refers to the passing through the magnetic layer of the protrusion portions of the greater part of the magnetic flux that passes through the magnetic layer of the depression portions when a transfer magnetic field is applied in the direction of the thickness of the protrusion portions; and does not refer to whether or not the magnetic layer has been formed as a continuous, connected layer over the protrusion portions and in the depression portions.

Further, the referent of "track direction" is the direction corresponding to the direction along the track formed on the slave medium by the magnetic transfer.

Note that it is advantageous, for example, that the transfer data be servo signals.

The magnetic transfer master medium according to the present invention is advantageously utilized in a magnetic transfer method wherein: the magnetic layer of the protrusion portions of said magnetic transfer master medium and the magnetic layer of the perpendicular magnetic recording medium are conjoined to form a conjoined body; and a transfer magnetic field is applied to said conjoined body in the direction perpendicular to the magnetic layer of said perpendicular magnetic recording medium so as to transfer the data from the master medium to the magnetic layer of said perpendicular magnetic recording medium. Here, the referents of "conjoined" include not only to the state wherein the respective surfaces of both of said mediums are in complete close contact with each other, but also states wherein said mediums are disposed in a state wherein a uniform interval is maintained between the respective surfaces thereof. The vertical recording medium, more specifically, can be a discoid magnetic recording medium such as a hard disk, a flexible disk, or the like.

Further, the magnetic transfer master medium according to the present invention is a magnetic transfer master medium comprising a substrate provided with a surface on which protrusion portions, which form a pattern, having a magnetic layer have been formed for transferring data to the magnetic layer of a perpendicular magnetic recording medium, wherein it is desirable that the magnetic layer is formed while a magnetic field is applied to the substrate in the direction perpendicular to the surface thereof.

At this time, the direction in which the magnetic field is applied when the magnetic layer is to be formed is substantially parallel to the direction in which the transfer magnetic field is applied when a magnetic transfer is to be performed; the orientation thereof can be in the same direction, or in the opposite direction. The easy magnetization axis of the magnetic layer is the direction substantially perpendicular to the surface of the master medium, and perpendicular magnetic anisotropy is given to the magnetic layer by the application of the magnetic field during the formation thereof.

Further, the magnetic transfer master medium according to the present invention is a magnetic transfer master medium comprising a substrate provided with a surface on which protrusion portions formed in a pattern having a magnetic layer has been formed for transferring data to the magnetic layer of a perpendicular magnetic recording medium, wherein it is desirable that a second magnetic layer having an easy magnetization axis parallel to the easy magnetization axis of the magnetic layer, and a coercive magnetic force larger than that of said magnetic layer is provided between the protrusion portions.

At this time, the second magnetic layer can be formed in the depression portions between the protrusion portions so as to completely fill in said depression portions, or can be formed in only a portion of the depression portions between the protrusion portions, as long as it is formed between the protrusion portions.

It is desirable that the second magnetic layer is magnetized in the opposite direction to initialized field in advance.

The phrase "perpendicular direction" refers to the direction perpendicular to the surface of the master medium. That is to say, the easy magnetization axis of the magnetic layer and the second magnetic layer are perpendicular to the surface of the master medium; the second magnetic layer is magnetized unidirectionally in said perpendicular direction in advance.

It is desirable that the coercive magnetic force of the second magnetic layer is approximately twice as large as that of the perpendicular magnetic recording medium. Note that with regard to the magnetic transfer master medium according to the present invention, it is preferable that the magnetic layer formed on the surfaces of the protrusion portions be of either a soft magnet or a semi-hard magnet.

According to the magnetic transfer master medium of the present invention: by making the ratio R between the cross-sectional height (i.e., the thickness of the magnetic layer) of the magnetic layer of the protrusion portions and the track direction width of the magnetic layer of the protrusion portions greater than or equal to 0.8 and less than or equal to 3.0, the signal quality can be improved by raising the effect of the attraction of magnetic flux the toward the magnetic layer of the surface of the protrusion portions, and signal omissions can be prevented, whereby a favorable magnetic transfer can be performed onto a perpendicular magnetic recording medium. If the ratio R is less than 0.8, the inverse magnetic field generated within the magnetic layer when a transfer magnetic field is applied in the direction of the cross-sectional height becomes larger, the attraction of the magnetic flux by said magnetic layer becomes deficient, and signal quality is reduced thereby. On the other hand, if the ratio R is greater than 3.0, damage to the surface of the magnetic layer of the surface of the protrusion portions becomes remarkable, and the contact deficiencies caused by said damaged pieces, or the transfer deficiencies due to signal deficiencies or the like caused by said damage occur.

Further, by the formation of the magnetic layer on not only the surface of the protrusion portions but on the depression portions between the protrusion portions as well, wherein the magnetic layer formed over the protrusion portions and the magnetic layer formed in the depression portions are magnetically linked, the attraction of the magnetic flux toward the magnetic layer of the surface of the protrusion portions is facilitated, and a favorable magnetic transfer can be performed.

Still further, according to the magnetic transfer master medium of the present invention: if the magnetic layer of the pattern of protrusion portions of the magnetic layer formed on the surface of the master medium is a magnetic layer that is formed while a magnetic field is applied in the direction perpendicular to the surface of the substrate, because this magnetic layer itself is thereby given perpendicular magnetic anisotropy by this magnetic field, the effective magnetic quantity of the magnetic layer due to the inverse magnetic field occurring when the master medium has been conjoined with a slave medium and a transfer magnetic field is applied to perform the magnetic transfer becomes larger, and the effect whereby the magnetic flux is attracted toward the magnetic layer of the surface of the protrusion portions is increased, the constraint of the magnetic flux can be improved, and the magnetic disorder at the border portions of the inverse magnetic fields and uninverted magnetic fields can be suppressed; whereby, the signal quality can be improved and a favorable magnetic transfer can be performed onto a perpendicular magnetic recording medium.

In addition, according to the magnetic transfer master medium of the present invention: if the interval between the protrusion portions of the surface of the master medium, which are provided with a magnetic layer, is provided with a second magnetic layer that has an easily magnetized axis parallel to that of the magnetic layer, and a coercive magnetic force larger than that of said magnetic layer, a second magnetic layer having a large coercive magnetic force and which has been magnetized in the direction opposite that in which the transfer magnetic field is to be applied can be used when the magnetic transfer is to be performed; by magnetizing the magnetic field in advance as described above, the effect whereby the magnetic flux is attracted toward the magnetic layer of the surface of the protrusion portions is increased, and the magnetic disorder at the border portions of the inverse magnetic fields and uninverted magnetic fields can be suppressed; whereby, the signal quality can be improved and a favorable magnetic transfer can be performed onto a perpendicular magnetic recording medium.

If the data borne by the magnetic transfer master medium of the present invention is, for example, servo signals, a favorable transfer of the servo signals can be easily performed onto a perpendicular magnetic recording medium; whereby preformatted perpendicular magnetic recording mediums can be manufactured efficiently.

According to the magnetic transfer method of the present invention: the magnetic transfer master medium of the present invention is conjoined with a perpendicular magnetic recording medium to form a conjoined body; and a transfer magnetic field is applied to said conjoined body in the direction perpendicular to the track surface of said perpendicular magnetic recording medium to transfer data to said perpendicular magnetic recording medium; wherein, as described above, because the attraction of the magnetic flux toward the soft magnetic layer of the surface of the protrusion portions is favorable, a favorable magnetic transfer can be performed.

Note that a perpendicular magnetic recording medium onto which a magnetic transfer has been performed according to the magnetic transfer method described above employing the magnetic transfer master medium of the present invention is a recording medium provided with a favorable data signal; for cases in which the transfer data is servo signals, in particular, recording and playback quality is improved due to the increased accuracy in the positioning of the magnetic head.

DESCRIPTION OF THE PREFERRED EMBODIMENTS

Hereinafter the preferred embodiments of the present invention will be explained with reference to the attached drawings. FIGS. 1–4 are cross-sectional views of a portion of respective magnetic transfer master mediums according to the present invention.

Figure 1:
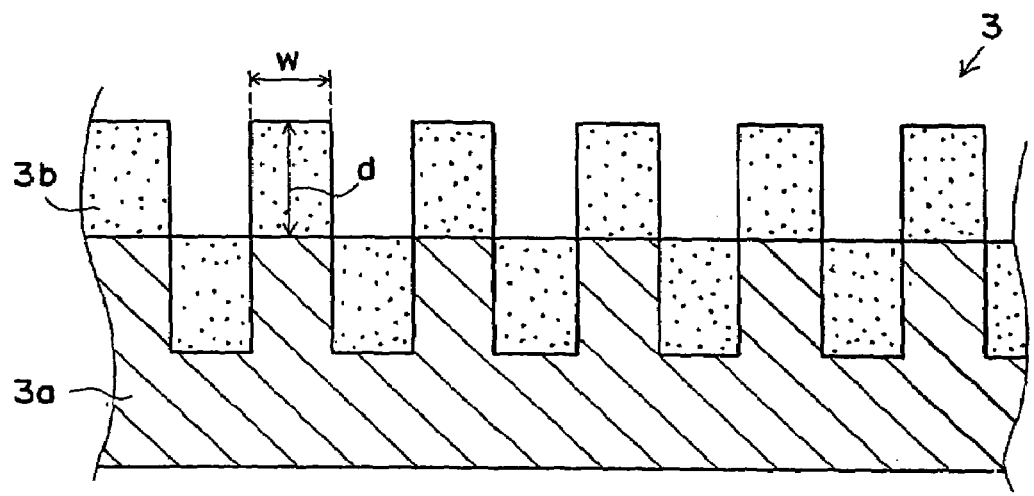
FIG. 1 is a cross-sectional view of a portion of a magnetic transfer master medium according to the first embodiment of the present invention.

FIG. 1 is a cross-sectional view of a portion of a magnetic transfer master medium according to the first embodiment of the present invention. The master medium 3 is formed in a discoid shape, as shown in FIG. 5 described below, and protrusion portions formed in a pattern for transferring data to the slave medium is provided on the surface thereof in the donut shaped region enclosed by the dotted line shown in FIG. 5.

Figure 5:
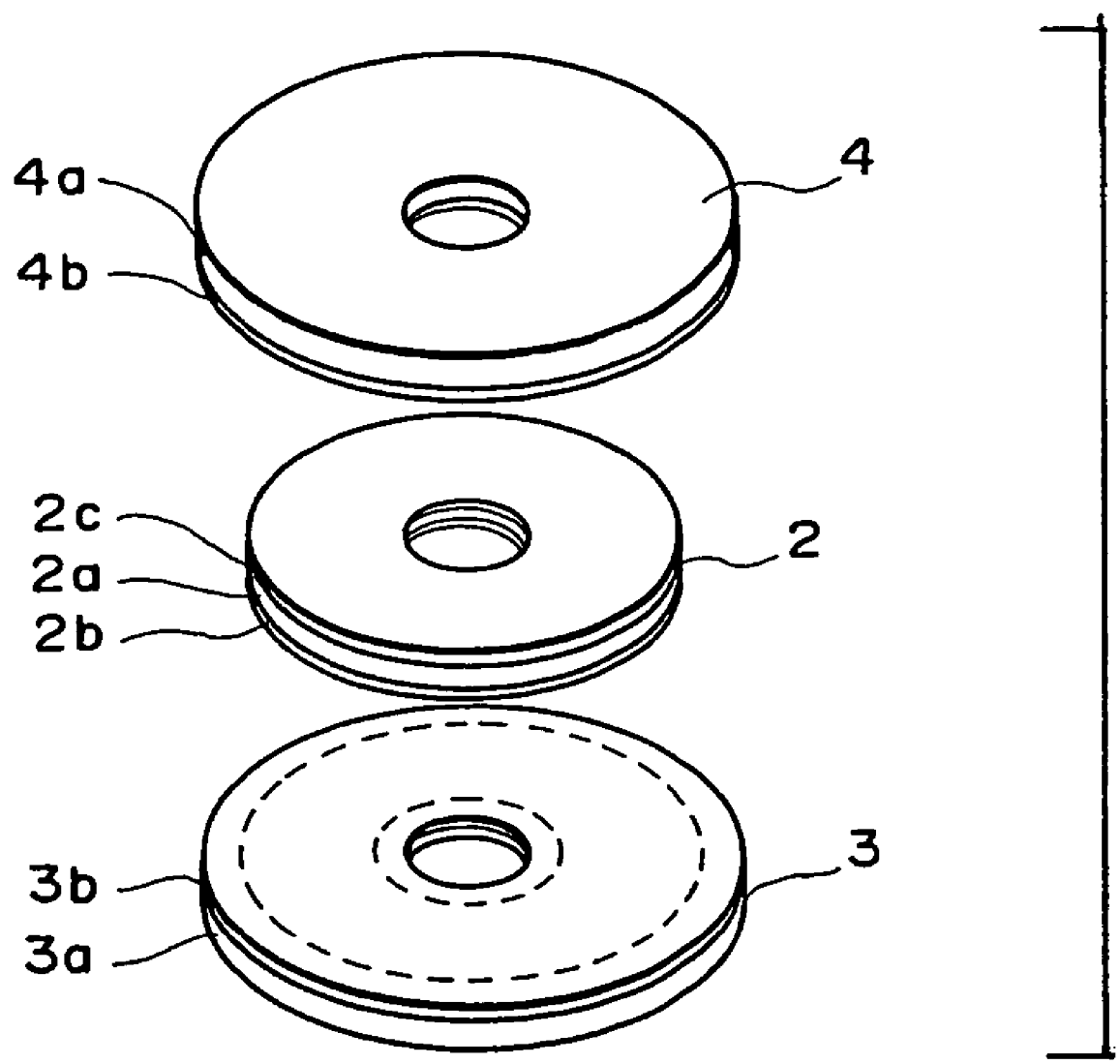
FIG. 5 is a perspective view of a slave medium and a master medium.

FIG. 1 is a cross-sectional view of a portion of the circumferential direction of the magnetic transfer master medium 3 shown in FIG. 5. The magnetic transfer master medium 3 shown in FIG. 1 comprises a substrate $3a$ provided with protrusion portions formed in a pattern on the surface thereof, and a soft magnetic layer $3b$ formed over the protrusions portions and in the depression portions between the protrusion portions. The protrusion portions formed on the surface of the substrate $3a$ have a width w in the circumferential direction (the track direction) thereof. Further, the soft magnetic layer $3b$ formed over the surface of the protrusion portions of the substrate $3a$ has a height d, and the width of the circumferential direction, that is, the width corresponding to the width in the circumferential direction of the uneven pattern of the substrate $3a$ is width w. Here, the ratio R ($R=d/w$) of the height d of the magnetic layer of the surface of the protrusion portions of the substrate $3a$ to the width w is greater than or equal to 0.8 and less than or equal to 3.0.

The magnetic layer formed on the surface of the protrusion portions of the substrate $3a$ and the magnetic layer formed in the depression portions between said protrusion portions are magnetically linked: for example, for a case in which a magnetic field is applied from the substrate side toward the direction of the soft magnetic layer, because the magnetic flux proceeds continuously from the soft magnetic layer of the depression portions to the soft magnetic layer of the protrusion portions, in comparison to cases in which the soft magnetic layer of the depression portions is not magnetically linked with that of the protrusion portions, or cases in which a soft magnetic layer has not been provided in the depression portions, the effect whereby the magnetic flux is attracted to the soft magnetic layer of the surface of the protrusion portions is higher.

Note that a synthetic resin, a ceramic material, an alloy, aluminum, glass, quartz, silicon, nickel, or the like is used to form the substrate 3a of the master medium 3. Further, the uneven pattern can be formed by use of a stamping method, a photo lithography method, or the like. Further, as to the material forming the soft magnetic layer 3b, Co, a Co alloy (CoNi, CoNiZr, CoNbTaZr, or the like), Fe, an Fe alloy (FeCo, FeCoNi, FeNiMo, FeAlSi, FeAl, FeTaN), Ni, a Ni alloy (NiFe), or the like can be employed therefor; it is particularly preferable that FeCo, or FeCoNi be employed.

The protrusion portions forming the pattern (uneven pattern) of the master medium 3 can be formed by use of a stamping method used in the field of manufacturing original disks of optical disks, a photo lithography method used in the field of manufacturing semi-conductors, or the like. Here, a simple explanation of the manufacture of a master medium will be given.

First, a layer of photoresist is formed on the smooth, flat surface of a glass substrate (or a quartz substrate) by use of a spin coating process; then, a laser beam (or an electron beam), which is modulated in correspondence to a servo signal, is emitted while this glass substrate is being rotated, and a predetermined pattern, such as that of a servo signal extending linearly in the radial direction from the rotational center of each track, is exposed over the entire surface of the photoresist on the portions corresponding to each frame on the circumference. Then, the photoresist is subjected to a development process, the exposed portion of the photoresist is removed and an original disk having an uneven pattern formed by the remaining photoresist is obtained thereby. Next, the surface of the uneven pattern thus formed on the surface of the original disk is subjected to a plating process (electroforming), whereby an Ni substrate having a positive uneven pattern is formed; said Ni substrate is then peeled away from the original disk. This Ni substrate can be employed as a master medium as is, or after a soft magnetic layer or a protective layer has been further applied over the uneven pattern thereof, as required.

Further, the aforementioned original disk can be metal plated to form a second original disk, and this second original disk used to perform a further metal plating process, whereby a substrate having a negative uneven pattern can be formed. Also, a third original disk can be formed by metal plating the second original disk or by hardening of a synthetic resin impressed onto the second original disk; this third original disk can be metal plated to obtain a substrate having a positive uneven pattern.

On the other hand, after the uneven pattern has been formed of photoresist on the glass substrate, etching can be performed to form holes in the glass substrate, whereby a substrate from which photoresist has been removed can be obtained; a substrate can be formed therefrom based on any of the methods described above.

Ni or a Ni alloy can be used as the material to form a metallic substrate, and any of various types of methods of forming a metallic layer, including electroless deposition methods, electroformation methods, sputtering methods, and ion plating methods can be employed as the plating method used to form this substrate. It is preferable that the height of the protrusions (the depth of the uneven pattern) formed on the substrate be in the range of 50–800 nm; more preferably, 80–600 nm. For cases in which this uneven pattern is that of a sample servo signal, said pattern is formed as a rectangular form of protrusion portions longer in the radial direction than the circumferential direction thereof. More specifically, it is preferable that the length in the radial direction be 0.05–20 μm, and 0.05–5 μm in the circumferential direction; it is preferable that a pattern of this type, in which the length in the radial direction is long and within this range, is selected as the pattern for bearing servo signal data.

The magnetic layer 3b, which is provided over the uneven pattern of the substrate, is formed of a magnetic material and by use of a physical vapor deposition means such as a vacuum deposition method, a sputtering method, an ion plating method, or by a metal plating method, etc. It is preferable that the thickness of the magnetic layer 3b be in the range of 50–500 nm, and even more preferably, in the range of 80–300 nm. Note that as already described, the ratio R of the height d of the magnetic layer of the surface of the protrusion portions of the substrate 3a to the width w thereof is 0.8–3.0, and more preferably, 0.9–2.5.

Note that it is preferable that a 5–30 nm Diamond Like Carbon (DLC) film or other type of protective film be formed over the soft magnetic layer of the surface of the protrusion portions, and that a lubricating layer be further provided. Also, it is also possible to provide a contact enhancing layer formed of Si or the like between the soft magnetic layer and the protective layer. The lubricant serves to improve the durability with respect to surface damage due to friction or the like when correcting misalignments occurring during the conjoining process.

Figure 2:
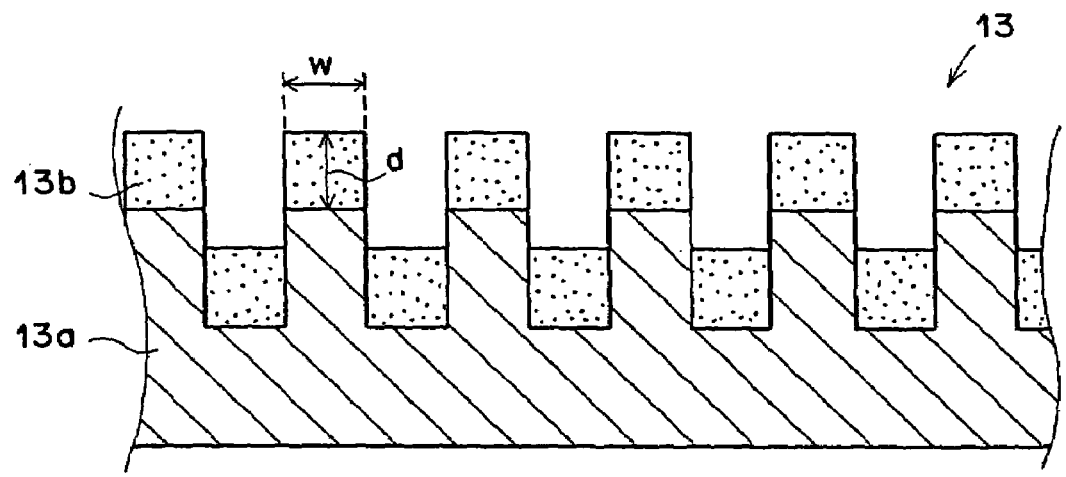
FIG. 2 is a cross-sectional view of a portion of a magnetic transfer master medium according to the second embodiment of the present invention.
Figure 3:
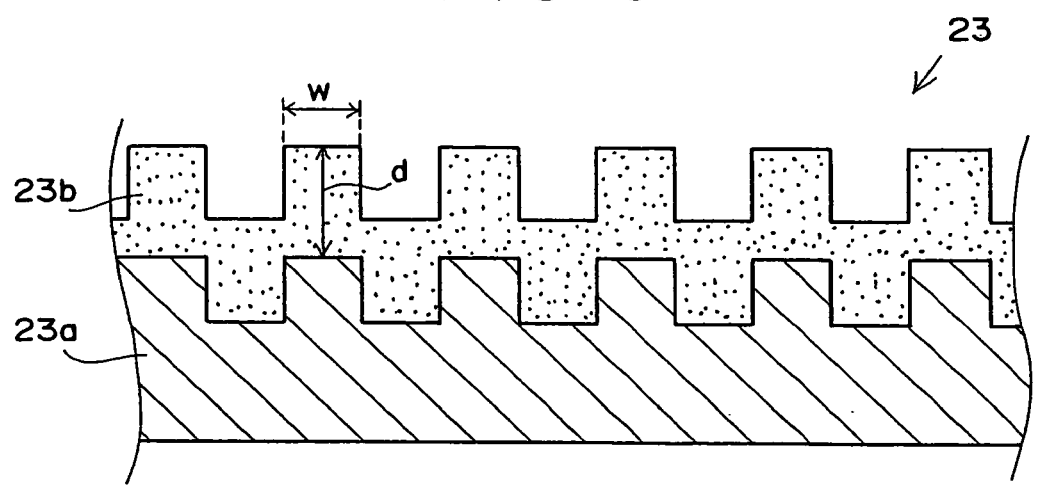
FIG. 3 is a cross-sectional view of a portion of a magnetic transfer master medium according to the third embodiment of the present invention.
Figure 4:
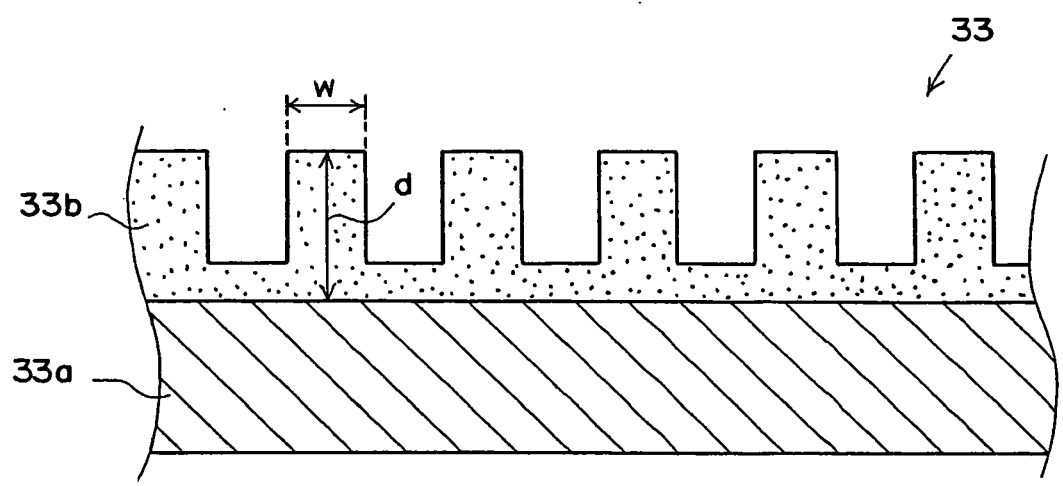
FIG. 4 is a cross-sectional view of a portion of a magnetic transfer master medium according to the fourth embodiment of the present invention.

FIGS. 2–4 are cross-sectional views of a portion of the magnetic transfer master mediums according to the second through fourth embodiments of the present invention, respectively. The master medium 13 and the master medium 23 shown in the FIGS. 2 and 3, respectively, comprise a substrate 13a, 23a provided with protrusion portions formed in a pattern on the surface thereof, and a soft magnetic layer 13b, 23b formed over the protrusions portions and in the depression portions between the protrusion portions, similar to the master medium 3 of the first embodiment. According to the master medium 13 according to the second embodiment shown in FIG. 2, the soft magnetic layer of the protrusion portions and the soft magnetic layer of the depression portions are separated by a spatial interval. Even in a separated state such as this, if the distance of the interval of the separation is such that magnetic linkage can be obtained thereacross, the same effect described above can be obtained.

Further, according to the master medium 23 of the third embodiment of the present invention shown in FIG. 3, as opposed to the master medium 13 shown in FIG. 2, the soft magnetic layer of the protrusion portions and the soft magnetic layer of the depression portions are formed so as to be completely continuous, so naturally, in this case also, the attraction of the magnetic flux toward the soft magnetic layer of the protrusion portions can be performed effectively.

The master mediums 13, 23 according to the second and third embodiments of the present invention, respectively, can be manufactured by the same method used to form the master medium 3 of the first embodiment; wherein, the thickness of the soft magnetic layer to be formed on the surface of the substrate can be changed when the formation thereof is performed.

As Shown in FIG. 4, the master medium 33 according to the fourth embodiment comprises a flat substrate 33a, and a soft magnetic layer 33b formed in an uneven pattern over the surface of said substrate 33a. In this manner, the flat substrate 33a can be used; wherein the protrusion and depression portions formed by the soft magnetic layer 3b can obtain the same effect as that obtained by the soft magnetic layer provided across the uneven pattern of the surface of the substrates of FIGS. 1–3 described above.

According to the master medium 33: after a uniform magnetic layer 33b of a thickness d has been formed over the substrate 33a, the depression and protrusion portions of the soft magnetic layer 33b can be formed by use of a photo lithography method or the like. Here, the thickness d of the soft magnetic layer 33b to the surface of the protrusion portions corresponds to the distance thereof from the surface of the substrate.

Note that according to each of the above-described embodiments of the master medium, the ratio R of the thickness d of each of the soft magnetic layers 13b, 23b, and 33b, each of which covers or forms the protrusion portions, to the width w in the circumferential direction thereof is greater than or equal to 0.8 and less than or equal to 3.

Next, an embodiment of the magnetic transfer method of employing the magnetic transfer master medium according to the present invention to transfer data to a slave medium will be explained.

FIG. 5 is a perspective view of a slave medium 2 and master mediums 3, 4. The slave medium utilized according to the magnetic transfer method of the present invention is a disk shaped magnetic recording medium such as a hard disk, a flexible disk, or the like, which has been provided with a magnetic recording layer on a single surface or on both surfaces thereof; in particular, a perpendicular magnetic recording medium on which a favorable magnetization direction of the magnetic recording layer has been formed in the direction perpendicular to the recording surface thereof, is utilized thereas. The slave medium 2 of the current embodiment shown in FIG. 5 comprises a discoid substrate 2a having a magnetic recording layer 2b and a magnetic recording layer 2c, respectively formed on each of both surfaces thereof.

Further, the master medium 3 is the master medium shown in the first embodiment, and is provided with protrusion portions formed in a pattern corresponding to the data to be recorded onto the lower recording surface 2b of the slave medium 2. The master medium 4 is of the same layered configuration as the master medium 3, and is provided with protrusion portions formed in a pattern corresponding to the data to be recorded onto the upper recording surface 2c of the slave medium 2. The master mediums 3, 4 comprise a substrate 3a, 4a, respectively, on each of which a pattern of protrusion portions has been formed, and a soft magnetic layer 3b, 4b, formed on the respective protrusion portions formed in a pattern thereon.

Figure 6A:
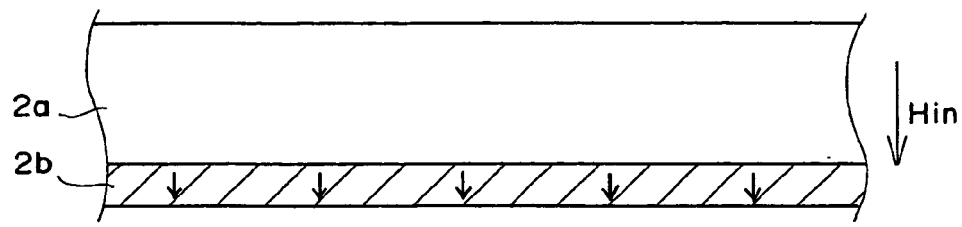
FIGS. 6A, 6B, and 6C are drawings illustrating the basic processes of a magnetic transfer method.
Figure 6B:
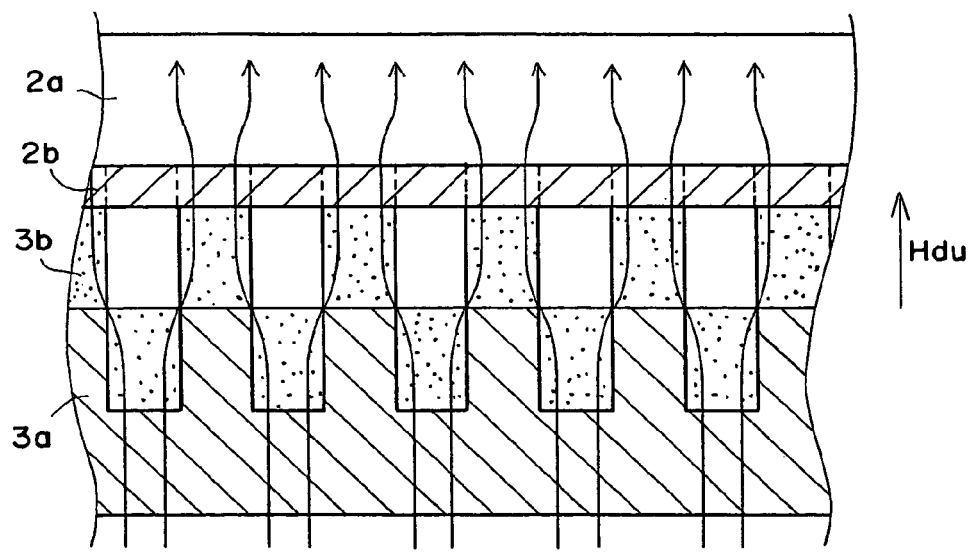
Figure 6C:
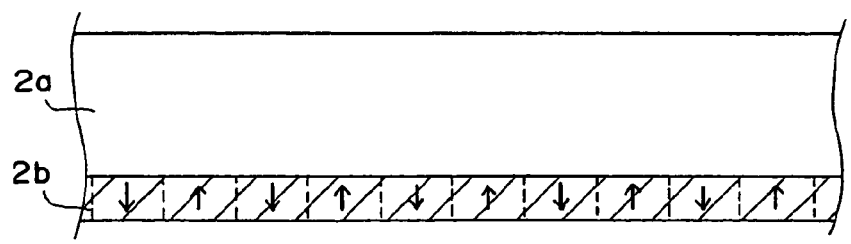

FIGS. 6A, 6B, and 6C illustrate the basic processes of the magnetic transfer method of the current embodiment. FIG. 6A illustrates the process wherein an initial magnetic field is applied unidirectionally so as to perform the initial magnetization of the slave medium. FIG. 6B illustrates the process wherein the slave medium the master medium are conjoined to form a conjoined body, and a transfer magnetic field is applied thereto in the direction opposite the direction in which the initial magnetization has been performed. FIG. 6C shows the state of the recording surface of the slave medium after the magnetic transfer has been performed. Note that, FIGS. 6A, 6B, and 6C show only the lower face recording surface 2b of the slave medium 2.

As shown in FIG. 6A, an initial direct current magnetic field Hin is applied in the direction perpendicular to the track surface of the of the slave medium 2 in advance, so as to initially magnetize the recording surface 2b thereof in one direction. Then, as shown in FIG. 6B, the surface of the recording layer 2b of this slave medium 2 is conjoined with the soft magnetic layer 3b formed on the surface of the protrusion portions of the master medium 3 to form a conjoined body, and a transfer magnetic field Hdu is applied thereto in the direction perpendicular to the track surface of the slave medium 2 and opposite that in which the initial direct current magnetic field Hin has been applied (i.e., in the direction opposite the direction in which the initial magnetization has been performed) to perform the magnetic transfer. As a result, the data (a servo signal, for example) corresponding to the protrusion portions formed in a pattern on the data bearing surface of the master medium 3 is magnetically transferred and recorded on the magnetic recording surface 2b of the slave medium 2, as shown in FIG. 6C. Here, an explanation has been proffered for the performance of a magnetic transfer from the lower-side master medium 3 to the lower-side recording surface 2b of the slave medium 2; however, as shown in FIG. 5, by conjoining the upper-side recording surface 2c to the lower-side master medium 4, the magnetic transfer can be performed the same as for the lower-side recording surface.

Further, even for cases in which the uneven pattern of the master medium 3 is a negative pattern, the opposite to that of the positive pattern shown in FIG. 6B, by reversing the above described directions in which the initial magnetic field Hin and the transfer magnetic field Hdu are applied, the same data can be magnetically transferred and recorded. Note that as to the initial magnetic field and the transfer magnetic field, it is necessary that a value therefor be determined based on a consideration of the coercive magnetic force of the slave medium 2, the relative magnetic permeability of the master and slave mediums, or the like.

As to the slave medium 2, a disk shaped magnetic recording medium such as a hard disk, a flexible disk or the like can be employed thereas. A magnetic recording layer thereof is formed by coating a layer of magnetic material, or by forming a thin metallic magnetic film recording layer on the surface thereof. As to the material forming the thin metallic magnetic layer, Co, a Co alloy (CoPtCr, CoCr, CoPtCrTa, CrNbTa, CoCeB, CoNi or the like), Fe, or an Fe alloy (FeCo, FeP, FeCoNi) can be employed therefor. Note that it is preferable that a non-magnetic sub layer be provided so as to provide the magnetic anisotropy required beneath the magnetic material. The crystalline structure and a lattice coefficient of the non-magnetic sub layer must be matched to that of the magnetic recording layer. To this end, Cr, CrTi, CoCr, Crta, CrMo, NiAl, Ru, Pd or the like is employed. Further, in order to stabilize the perpendicular magnetization of the magnetic layer, or to improve the recording and playback sensitivity, it is preferable that a backing layer formed of a soft magnetic layer be provided beneath the nonmagnetic sub layer.

Note that it is preferable that the thickness of the magnetic recording layer be greater than or equal to 10 nm and less than or equal to 500 nm, and more preferably greater than or equal to 20 nm and less than or equal to 200 nm. Further, it is preferable that the thickness of the non-magnetic layer be greater than or equal to 10 nm and less than or equal to 150 nm, and more preferably greater than or equal to 20 nm and less than or equal to 80 nm. Still further, it is preferable that the thickness of the backing layer be greater than or equal to 50 nm and less than or equal to 2000 nm, and more preferably greater than or equal to 80 nm and less than or equal to 400 nm.

Next, the results of an actual experiment to determine the transfer accuracy of a magnetic transfer performed utilizing the magnetic transfer master medium according to the present invention will be explained.

The slave medium utilized in the experiment was formed in a vacuum film forming apparatus (a Shibaura Mechatronix: S-505 sputtering apparatus), under conditions wherein Argon has been introduced after depressurization at room temperature to $1.33 \times 10^{-5}$ Pa ($10^{-7}$ Torr) and the pressure is 0.4 Pa ($3 \times 10^{-3}$ Torr). A glass plate was heated to 200° C., a 300 nm NiFe layer that serves as the backing layer formed by the soft magnetic layer, a 30 nm layer of Ti that serves as the non-magnetic sub layer, and a 30 nm layer of CoCrPt that serves as the magnetic recording layer were sequentially formed thereon to produce a 3.5" disk shaped magnetic recording medium having a saturation magnetization Ms of 5.7 T (4700 Gauss), and a magnetic coercive force Hcs of 199 kA/m (2500 Oe).

The evaluation of the signal quality was performed by use of a magnetic conversion property measuring apparatus (Kyodo Electronics SS-60) to evaluate the transfer signal of the slave medium. As to the head, an MR head is employed, wherein: the read head gap is 0.19 μm; the read track width is 2.0 μm; is the write head gap is 0.4 μm; and the write track width is 2.6 μm. The read in signal is subjected to a frequency analysis by a spectral analyzer; wherein the peak intensity (C) of a primary signal, narrow band noise, and the ratio C/N are measured. The C/N value computed of the signal recorded and read back by the same head is designated as 0 dB, the relative value ΔC/N is obtained: the evaluation is favorable (indicated by an "O") if the value ΔC/N is greater than or equal to −2.0 dB, and deficient (indicated by an "X") if the value ΔC/N is less than −2.0 dB.

Next, the evaluation of the signal omissions and the contact deficiencies will be explained. A magnetic developing fluid (Sigma Phi Chemicals Sigmarker-Q) was diluted to $\frac{1}{10}^{th}$ concentration. Said magnetic developing liquid was dripped onto the recording surface of the slave medium on which a magnetic transfer has been performed, dried, and the signal omissions and the contact deficiencies are evaluated based on the amount of change to the edge of the signal pattern of the developed magnetic transfer signal pattern. More specifically, one hundred random viewing fields of the portion of the recording surface of the slave medium on which the magnetic transfer has been performed were observed at a 50 times magnification by use of a differential interference microscope: if less than five locations therein were found to have signal omissions, the evaluation was favorable (indicated by an "O"), and if five or more locations therein were found to have signal omission, the transfer was evaluated as deficient (indicated by an "X").

The master medium of example 1 comprises a discoid quartz substrate on the surface of which a pattern of protrusion portions having a track width of 2.5 μm, a track pitch of 3.0 μm, a bit length of 0.5 μm and of a height of 2.5 μm is formed in the region of the disk 20 mm to 40 mm in the radial direction from the center thereof. Note that a soft magnetic layer of FeCo30 at % is formed on this substrate by a sputtering method wherein the Argon sputtering pressure is $1.5 \times 10^{-1}$ Pa (1.08 mTorr), and the electrical current introduced is 2.80 W/cm². Note that the width W of the protrusion portions in the circumferential direction (the bit length) corresponds to 0.5 μm. That is to say, the master medium of example 1 has a cross-section wherein the soft magnetic layer of the surface of the protrusion portions has a height (thickness) d=0.5 μm, a width in the circumferential direction W=0.5 μm, and the ratio R therebetween is R=1.

The master medium of example 2 is a master medium of the same type as that of example 1, and has a cross-section wherein the soft magnetic layer of the surface of the protrusion portions has a height d=1.0 μm, a width in the circumferential direction w=0.5 μm, and the ratio R therebetween is R=2.

The master medium of example 3 is a master medium of the same type as that of example 1, and has a cross-section wherein the soft magnetic layer of the surface of the protrusion portions has a height d=1.4 μm, a width in the circumferential direction w=0.5 μm, and the ratio R therebetween is R=2.8.

The master medium of comparative example 1 is a master medium comprising a flat discoid quartz substrate on which a soft magnetic layer 0.5 μm in thickness has been formed, after which said magnetic layer has been processed into a pattern by use of a lithography technology; wherein the soft magnetic layer is formed only on the portions corresponding to the protrusion portions, and because the soft magnetic layer is not formed in the depression portions, the protrusion portions and the depression portions are not magnetically linked. This master medium has a cross-section wherein the soft magnetic layer of the surface of the protrusion portions has a height (thickness) d=0.5 μm, a width in the circumferential direction w=0.5 μm, and the ratio R therebetween is R=1. The master medium of comparative example 1 has a cross-section wherein the soft magnetic layer of the surface of the protrusion portions has a height d=0.5 μm, a width in the circumferential direction w=0.5 μm, and the ratio R therebetween is R=1.

The master medium of comparative example 2 comprises a quartz substrate provided with protrusion portions formed in a pattern over which a soft magnetic layer has been formed, that is, is a master medium of the same type as that of example 1; said soft magnetic layer is 0.35 μm in thickness, and has a cross-section wherein the soft magnetic layer of the surface of the protrusion portions has a height (thickness) d=0.35 μm, a width in the circumferential direction w=0.5 μm, and the ratio R therebetween is R=0.7.

The master medium of comparative example 3 comprises a quartz substrate provided with protrusion portions formed in a pattern over which a soft magnetic layer has been formed, that is, is a master medium of the same type as that of example 1; said soft magnetic layer is 2.0 μm in thickness, and has a cross-section wherein the soft magnetic layer of the surface of the protrusion portions has a height d=2.0 μm, a width in the circumferential direction w=0.5 μm, and the ratio R therebetween is R=4.

A magnetic transfer to the slave medium described above was performed utilizing each of the master mediums of each of the examples and comparative examples described above, and an evaluation of the signal quality, the number of signal omissions, and the contact property was performed. The results thereof are shown in Chart 1.

CHART 1

| | Soft magnetic layer in depression portions? (magnetic linkage) | R = d/w | Signal evaluation of relative C/N (dB) | Signal omissions (number of), contact property evaluation |
|---|---|---|---|---|
| Example 1 | Yes | 1.0 | −0.4 (O) | 4 (O) |
| Example 2 | Yes | 2.0 | +0.1 (O) | 3 (O) |
| Example 3 | Yes | 2.8 | −1.1 (O) | 4 (O) |
| Comparative Example 1 | No | 1.0 | −3.3 (X) | 3 (O) |
| Comparative Example 2 | Yes | 0.7 | −2.1 (X) | 2 (O) |
| Comparative Example 3 | Yes | 4.0 | −0.1 (O) | 13 (X) |

As shown in Chart 1, for cases in which any of the master mediums of Examples 1–3 are used, the ratio R between the cross-sectional height of the soft magnetic layer of the protrusion portions of the master medium (that is the thickness of the magnetic layer) and the track direction width w of the protrusion portions is greater than or equal to 0.8 and less than or equal to 3; further, for master mediums having a soft magnetic formed in the depression portions between the protrusion portions to provide magnetic linkage therebetween, a favorable evaluation of the signal quality, the number of signal omissions, and the contact property is obtained. On the other hand, for cases in which the master mediums of Comparative Examples 1–3 are used, for master mediums not having magnetic conjoinment between the depression portions and the protrusion portions, or for master mediums wherein the ratio R thereof is not within the range defined as greater than or equal to 0.8 and less than or equal to 3, one property from among the signal quality, the signal omissions, and the contact property is deficient.

Figure 7:
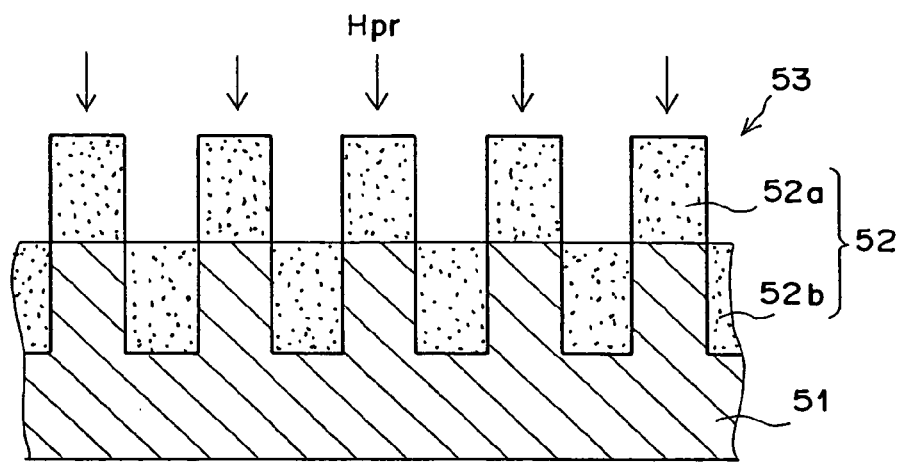
FIG. 7 is a cross-sectional view of a portion of a magnetic transfer master medium according to another embodiment of the present invention.

Next, with reference to the model cross-sectional view shown in FIG. 7, a magnetic transfer master medium according to another embodiment of the present invention will be explained.

The magnetic transfer master medium 53 according to the current embodiment comprises: a substrate 51 having a surface on which depression portions and protrusion portions have been formed in a pattern; a soft magnetic layer 52 formed on the surface of the protrusion portions and depression portions; wherein the soft magnetic layer 52 comprises a soft magnetic layer 52a of the surface of the protrusion portions and a soft magnetic layer 52b formed in the depression portions between the protrusion portions, and is formed while a magnetic field Hpr is applied to the substrate 51 in the direction perpendicular to the surface thereof.

The formation of the magnetic layer 52 is performed by use of a sputtering method or the like, and while a magnetic field Hpr is being applied to the substrate 51 in the direction perpendicular to the surface thereof. The application of the magnetic field Hpr during the formation the soft magnetic layer 52 serves to provide perpendicular magnetic anisotropy to the formed magnetic layer 52 in the direction in which said magnetic field Hpr has been applied. That is to say, the easy magnetization axis of the soft magnetic layer 52 is the direction substantially perpendicular to the surface of the master medium 53. Note that the direction in which the magnetic field Hpr is applied is substantially parallel to the direction in which the transfer magnetic field Hdu is applied when a magnetic transfer is to be performed; the orientation thereof can be in the same direction, or in the opposite direction.

If the easy magnetization axis of the soft magnetic layer 52 is made to be substantially perpendicular to the surface of the master medium 53 in this manner, the effect whereby the magnetic flux is attracted to the soft magnetic layer when the transfer magnetic field is applied can be improved.

Next, a master medium according to yet another embodiment of the present invention will be explained.

Figure 8:
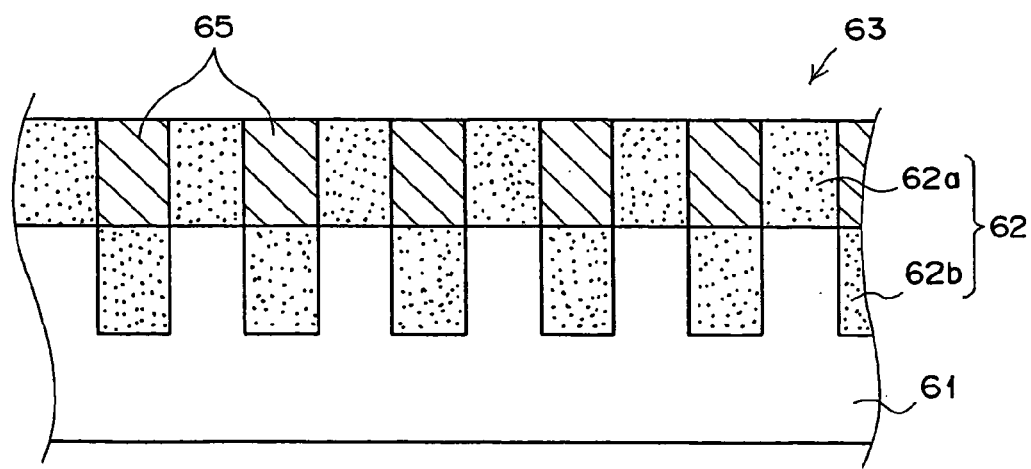
FIG. 8 is a cross-sectional view of a portion of a magnetic transfer master medium according to another embodiment of the present invention.

The master medium 63 shown in FIG. 8 comprises a substrate 61 provided with a surface on which protrusion portions formed in a pattern and a soft magnetic layer 62, which is formed over the protrusion portions and in the depression portions between said protrusion portions for transferring data to the magnetic layer of a perpendicular magnetic recording medium; further comprising a magnetic layer 65 for filling in the depression portion region between the protrusion portions of the soft magnetic layer. Note that, here, the magnetic layer 65 can be formed in the depression portions directly, that is, without having provided the soft magnetic layer 62 in the depression portions.

The magnetic layer 65 has an easy magnetization axis parallel to the easy magnetization axis of the soft magnetic layer 62. The magnetic layer 65 is magnetized in advance unidirectionally along the easy magnetization axis thereof, and when a magnetic field is applied in the direction opposite this along the easy magnetization axis, the magnetic flux is repulsed by the magnetization of the magnetic layer 65, and because said magnetic flux is forcibly directed thereby toward the soft magnetic layer 62b of the protrusion portions, the effect whereby magnetic flux is attracted to the soft magnetic layer 62b is high. Note that here, the easy magnetization axis of the soft magnetic layer 62 and the magnetic layer 65 are both substantially perpendicular to the surface of the master medium.

Note that it is preferable that the material used to form the magnetic layer 65 has a magnetic coercive force larger than that of the soft magnetic layer 62, and of a degree that prevents the inversion of the magnetization thereof when the transfer magnetic field is applied; a coercive magnetic force approximately twice that of the Hcs of the magnetic layer of the magnetic recording medium serving as the slave medium 2 is adequate.

Next, an embodiment of the magnetic transfer method of employing the magnetic transfer master medium 63 according to the present invention to transfer data to the slave medium 2 will be explained.

Figure 9A:
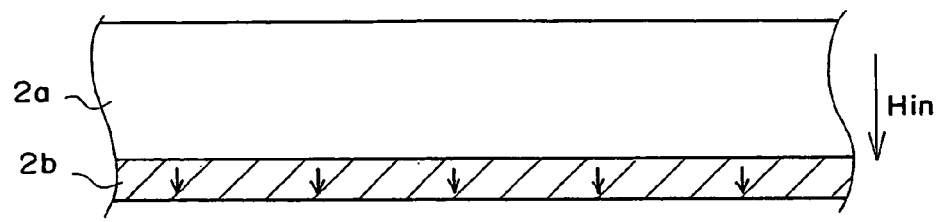
FIGS. 9A, 9B, and 9C are drawings illustrating the basic processes of a magnetic transfer method utilizing the magnetic transfer master medium of FIG. 8.
Figure 9B:
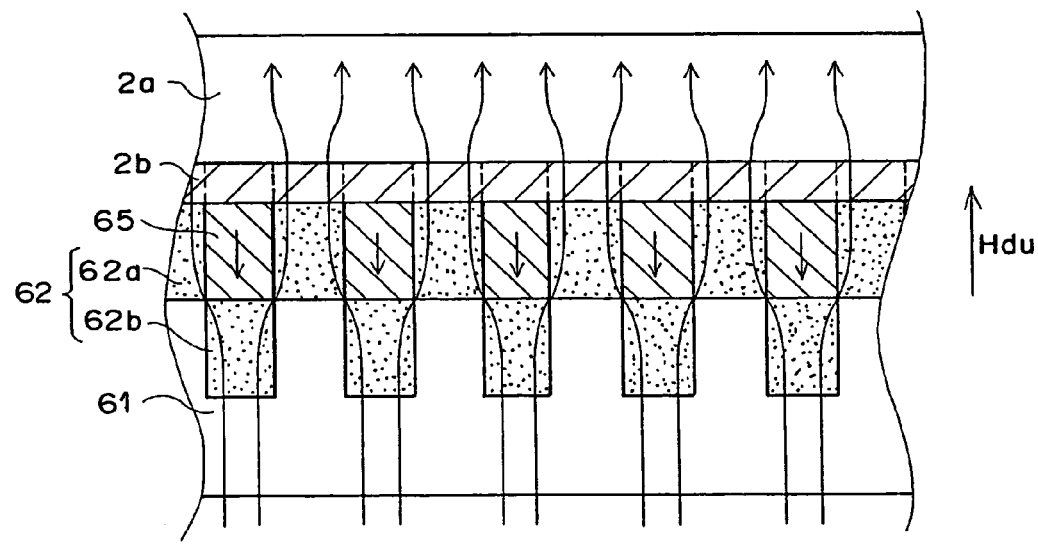
Figure 9C:
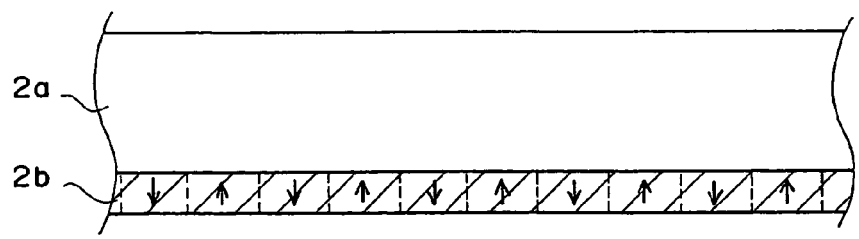

FIGS. 9A, 9B, and 9C illustrate the basic processes of the magnetic transfer method of the current embodiment. FIG. 9A illustrates the process wherein an initial magnetic field is applied unidirectionally so as to perform the initial magnetization of the slave medium. FIG. 9B illustrates the process wherein the slave medium and the master medium are conjoined to form a conjoined body, and a transfer magnetic field is applied thereto in the direction opposite the direction in which the initial magnetization has been performed. FIG. 9C shows the state of the recording surface of the slave medium after the magnetic transfer has been performed. Note that, FIGS. 9A, 9B, and 9C show only the lower face recording surface 2b of the slave medium 2.

As shown in FIG. 9A, an initial direct current magnetic field Hin is applied in the direction perpendicular to the track surface of the of the slave medium 2 in advance, so as to initially magnetize the recording surface 2b thereof in one direction. Then, as shown in FIG. 9B, the surface of the recording layer 2b of this slave medium 2 is conjoined with the surface of the master medium 63, which has been provided with a magnetic layer 65 that has been unidirectionally magnetized, to form a conjoined body, and a transfer magnetic field Hdu is applied thereto in the direction perpendicular to the track surface of the slave medium 2 and opposite that in which the initial direct current magnetic field Hin has been applied (which is also the direction opposite the direction in which the magnetic layer 65 of the master medium 63 has been magnetized) to perform the magnetic transfer. As a result, the data (e.g., a servo signal) corresponding to the protrusion portions formed in a pattern on the data bearing surface of the master medium 63 is magnetically transferred and recorded on the magnetic recording surface 2b of the slave medium 2, as shown in FIG. 9C. Here, an explanation has been proffered for the performance of a magnetic transfer from the lower-side master medium 3 to the lower-side recording surface 2b of the slave medium 2; however, as shown in FIG. 5, by conjoining the upper-side recording surface 2c to the lower-side master medium 4, the magnetic transfer can be performed the same as for the lower-side recording surface.

In this manner, by magnetizing the magnetic layer 65, which has been provided in the depression portions between the protrusion portions of the surface of the master medium, in advance in the direction opposite that in which the transfer magnetic field is to be applied, the effect whereby the magnetic flux occurring when the transfer magnetic field is applied is attracted to the soft magnetic layer 62 of the protrusion portions is improved, whereby a favorable magnetic transfer can be improved.

Note that as to the initial magnetic field and the transfer magnetic field, it is necessary that a value therefor be determined based on a consideration of the coercive magnetic force of the slave medium 2, the relative magnetic permeability of the master and slave mediums, or the like.

What is claimed is:

1. A method of producing a magnetic transfer master medium, the method comprising:
   preparing a non-magnetic substrate having a surface containing protrusion portions and depression portions to form data to be transferred; and
   forming a magnetic layer on said surface of said non-magnetic substrate while a magnetic field is applied to said non-magnetic substrate in a direction perpendicular to said surface of said non-magnetic substrate;
   wherein said magnetic layer formed on said protrusion portions and said magnetic layer formed on said depression portions are magnetically linked so as to enable all magnetic flux generated by applying a transfer magnetic field perpendicular to a surface of said magnetic transfer master medium to pass through said magnetic layer formed on said protrusion portions and said magnetic layer formed on said depression portions in a same direction as that of said transfer magnetic field.

2. The method of claim 1, wherein a ratio of a thickness of said magnetic layer formed on said protrusion portions to a width of said magnetic layer formed on said protrusion portions is within a range of 0.8 to 3.

3. The method of claim 1, wherein a ratio of a thickness of said magnetic layer formed on said protrusion portions to a width of said magnetic layer formed on said protrusion portions is within a range of 0.9 to 2.5.

4. The method of claim 1, wherein said data represent servo signals.

5. The method of claim 1, wherein said non-magnetic substrate is made of a material selected from the group consisting of a synthetic resin, a ceramic material, aluminum, glass, quartz and silicon.

6. The method of claim 1, wherein said magnetic layer comprises a soft magnetic layer.

7. The method of claim 6, wherein said soft magnetic layer comprises Fe, an Fe alloy, Ni or a Ni alloy.

8. The method of claim 6, wherein said soft magnetic layer comprises an Fe—Co alloy or an Fe—Co—Ni alloy.

9. The method of claim 1, wherein said magnetic layer is formed by a vacuum deposition method, a sputtering method or an ion plating method.

10. The method of claim 1, wherein said magnetic layer has a thickness ranging from 50 to 500 nm.

11. The method of claim 1, wherein said magnetic layer has a thickness ranging from 80 to 300 nm.

12. The method of claim 1, wherein a height of said protrusion portions from a surface of said depression portions ranges from 50 to 800 nm.

13. The method of claim 1, wherein a height of said protrusion portions from a surface of said depression portions ranges from 80 to 600 nm.

14. The method of claim 1, further comprising forming a diamond like carbon film over said magnetic layer in a thickness ranging from 5 to 30 nm.

* * * * *